US012145490B2

(12) United States Patent
Legh et al.

(10) Patent No.: US 12,145,490 B2
(45) Date of Patent: Nov. 19, 2024

(54) SEAT VIBRATION DAMPENING SYSTEM AND METHOD FOR CONTROLLING SAME

(71) Applicant: Lear Corporation, Southfield, MI (US)

(72) Inventors: Darren Legh, Wolverhampton (GB); Martin Hitchman, Coventry (GB); Adam Freeman Lea, Coventry (GB)

(73) Assignee: LEAR CORPORATION, Southfield, MI (US)

( * ) Notice: Subject to any disclaimer, the term of this patent is extended or adjusted under 35 U.S.C. 154(b) by 148 days.

(21) Appl. No.: 18/159,125

(22) Filed: Jan. 25, 2023

(65) Prior Publication Data

US 2024/0246467 A1 Jul. 25, 2024

(51) Int. Cl.
*B60N 2/42* (2006.01)
*B06B 1/14* (2006.01)
*B60N 2/50* (2006.01)
*B60N 2/90* (2018.01)

(52) U.S. Cl.
CPC ............... *B60N 2/90* (2018.02); *B06B 1/14* (2013.01); *B60N 2/42* (2013.01); *B60N 2/50* (2013.01); *B60N 2/501* (2013.01)

(58) Field of Classification Search
CPC . B60N 2/50; B60N 2/501; B60N 2/42; B60N 2/42736; B60N 2/42745
USPC ........................................ 297/216.1, 216.13
See application file for complete search history.

(56) References Cited

U.S. PATENT DOCUMENTS

| | | | |
|---|---|---|---|
| 5,652,704 A * | 7/1997 | Catanzarite | B60N 2/501 248/550 |
| 5,722,722 A * | 3/1998 | Massara | B60N 2/42745 297/216.13 |
| 6,811,227 B2 | 11/2004 | Andersson et al. | |
| 7,694,946 B2 * | 4/2010 | Shoemaker | B60N 2/505 248/550 |
| 7,887,033 B2 * | 2/2011 | Shoemaker | B60N 2/508 267/136 |
| 8,444,123 B2 * | 5/2013 | Shoemaker | B60N 2/508 267/136 |
| 8,473,163 B2 * | 6/2013 | Hiemenz | B60R 21/0136 701/45 |
| 8,678,508 B2 * | 3/2014 | Kolb | B60N 2/544 297/344.13 |
| 8,757,600 B2 * | 6/2014 | Haller | B60N 2/501 267/64.11 |
| 8,833,849 B2 | 9/2014 | Ishimoto et al. | |
| 9,061,767 B2 * | 6/2015 | Rojas Gallego | B60N 2/42736 |
| 9,973,113 B1 * | 5/2018 | Lou | B60N 2/4242 |
| 10,093,203 B1 * | 10/2018 | Lou | H02J 7/32 |
| 10,293,718 B1 * | 5/2019 | Ilievski | B60N 2/99 |

(Continued)

*Primary Examiner* — Rodney B White
(74) *Attorney, Agent, or Firm* — Brooks Kushman, P.C.

(57) ABSTRACT

The present disclosure provides a vehicle seat vibration dampening system including a vibration sensor that senses vibration of a vehicle seat generated by movement of a vehicle on a roadway, wherein the vibration sensor generates a signal indicative of the sensed vibration, a controller that determines, based on the signal generated by the vibration sensor, a counter vibration to dampen the sensed vibration of the vehicle seat and, based on the determination, produces a control signal to effect generation of the counter vibration, and a transducer that generates the counter vibration of the vehicle seat in response to the control signal to dampen the sensed vibration of the vehicle seat.

20 Claims, 4 Drawing Sheets

(56) References Cited

U.S. PATENT DOCUMENTS

| | | | |
|---|---|---|---|
| 10,399,469 B2 | 9/2019 | Won et al. | |
| 10,974,619 B2* | 4/2021 | Kaku | A61B 5/6893 |
| 11,084,403 B1* | 8/2021 | Muck | B60N 2/501 |
| 11,180,060 B2* | 11/2021 | Muck | B60N 2/20 |
| 11,584,269 B2* | 2/2023 | Muck | B60N 2/544 |
| 11,634,051 B2* | 4/2023 | Muck | B60N 2/028 |
| | | | 297/344.14 |
| 11,897,377 B2* | 2/2024 | Muck | B60N 2/525 |
| 2004/0089988 A1* | 5/2004 | Scott | F15B 15/10 |
| | | | 267/136 |
| 2005/0168046 A1 | 8/2005 | Hadi et al. | |
| 2021/0178933 A1* | 6/2021 | Kaku | B60N 2/0034 |
| 2022/0134920 A1* | 5/2022 | Barrie | F16F 15/022 |
| | | | 267/131 |

* cited by examiner

SEAT VIBRATION DAMPENING SYSTEM AND METHOD FOR CONTROLLING SAME

TECHNICAL FIELD

The present disclosure relates to seat vibration dampening system and a method for controlling a seat vibration dampening system.

DETAILED DESCRIPTION

Figures 1, 2:
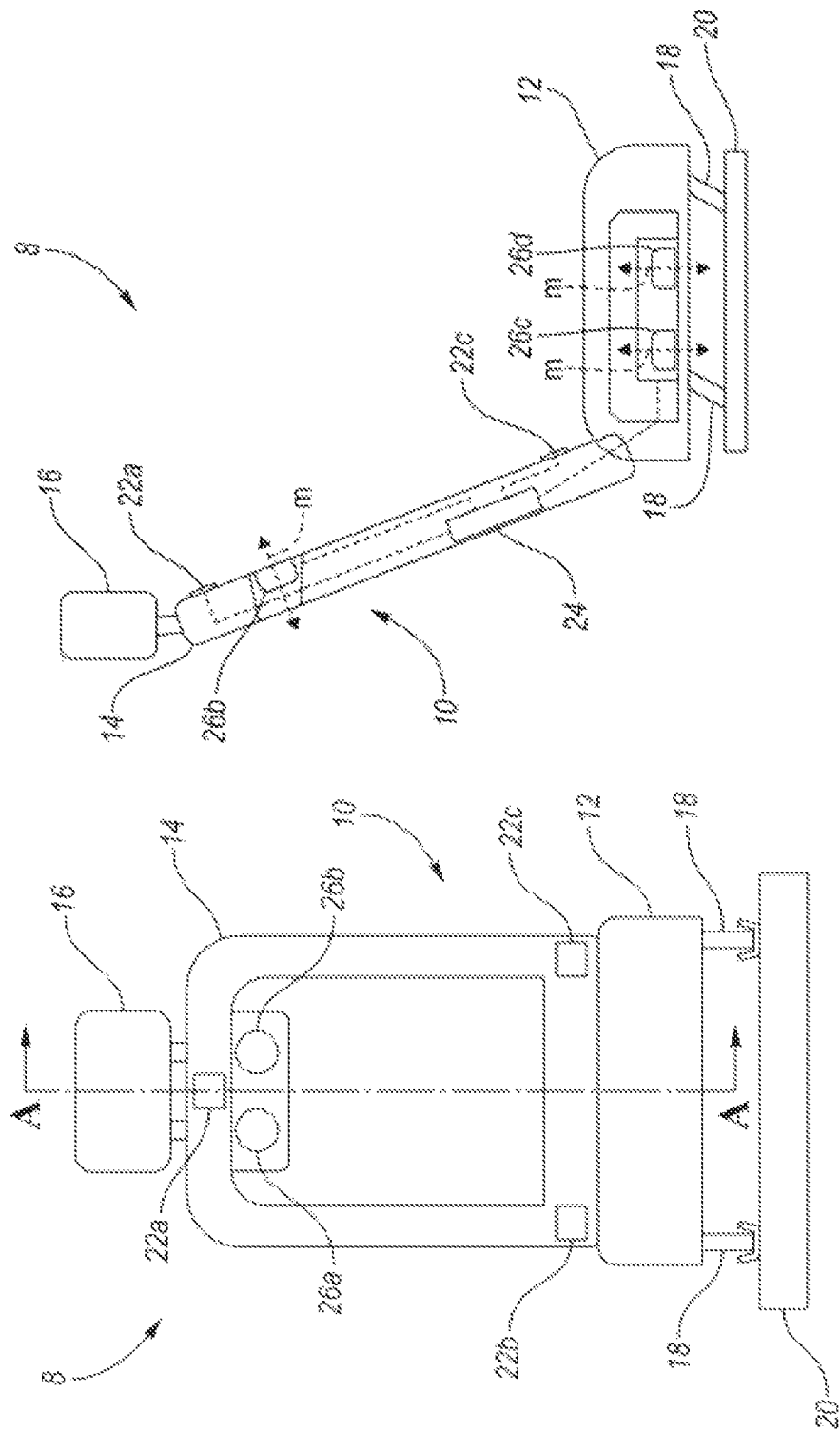
FIG. 1 is a front view of a seat and a non-limiting, exemplar embodiment of a seat vibration dampening system according to the present application.
FIG. 2 is a cross-sectional view of the seat and the seat vibration dampening system according to one non-limiting exemplary embodiment of the present application shown in FIG. 1, taken along line A-A thereof.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, features, and elements have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" and/or "at least one" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As is well known in the automotive industry, all vehicle manufacturers seek to reduce cabin vibrations. In that regard, mass dampers may be used to reduce seat vibrations. Such mass dampers include a passive weight suspended from a vehicle seat frame (e.g., a seat back) with resilient bands. In general, the weight moves passively in response to vehicle movement as the vehicle is driven, and the inertia of the weight can cancel out resonance in the vehicle seat frame.

The system and method of the present disclosure represent an improvement over such passive mass dampers for vehicle seats. The present disclosure describes a system and method that utilize low frequency transducers/shakers for the purpose of reduction of vehicle seat vibration. Such transducers are fitted to a vehicle seat for the reduction of vibration resulting from road loading. In particular, such transducers are mounted in an effective way for the strategic cancelation of road generated vibrations, and are coupled with vibration detection measuring equipment and software control to excite the system to cancel out input vibrations.

The system and method of the present disclosure are thus active, rather than passive, and cancel out road load vibration by sensing seat vibration and generating in response a counter vibration. In such a fashion, the system and method of the present disclosure solve the problem of seat vibrations and/or seat resonance caused by vibrations generated as a result of driving a vehicle on a roadway.

FIG. 1 is a front view of a seat and a non-limiting, exemplar embodiment of a seat vibration dampening system 8 according to the present application. FIG. 2 is a cross-sectional view of the seat and the seat vibration dampening system 8 according to one non-limiting exemplary embodiment of the present application shown in FIG. 1, taken along line A-A thereof As seen therein, a vehicle seat 10 includes a seat bottom portion 12, a seat back portion 14, and a headrest 16. The vehicle seat 10 is mounted by brackets 18 to a floor 20 of a vehicle (not shown), which may be an internal combustion engine (ICE) vehicle, an electric vehicle, a hybrid electric vehicle, or any other type vehicle. The seat 10 is equipped with a vibration dampening system 8 comprising at least one vibration sensor 22a, 22b, 22c that sense or detect input vibrations of the vehicle seat 10 from road loading, i.e., vibration of the vehicle seat 10 generated by or resulting from movement of the vehicle on a roadway, as may be transferred to the vehicle seat 10 through the brackets 18 mounting the vehicle seat 10 to the vehicle floor 20. In that regard, road loading is the predominant cause of vibrations in the vehicle seat 10, and any other vibration of the vehicle seat 10 resulting from operation of vehicle systems or components (such as an ICE or any components of an electric or hybrid electric vehicle) are mixed with such road loading vibration of the vehicle seat 10. The at least one vibration sensor 22a, 22b, 22c may be an accelerometer or any other type of sensor suitable for sensing vibration, such as a displacement sensor or a velocity sensor.

Referring still to FIGS. 1 and 2, a vibration sensors 22a is located or mounted on the seat back portion 14 along a longitudinal axis (e.g., A-A) bisecting the seat back portion 14 from a first or top side of the seat back portion 14 to a second or bottom side of the seat back portion 14 (e.g., at or proximate a top of the seat back portion 14). As also seen therein, a vibration sensor 22b is located or mounted on a first or left side of a longitudinal axis (e.g., A-A) bisecting the seat back portion 1 from a first or top side of the seat back portion to a second or bottom side of the seat back portion 14 (e.g., at or proximate a left side or left edge of the seat back portion 14), and a vibration sensor 22c is located or mounted on a second or right side of such a longitudinal axis (e.g., A-A) bisecting the seat back portion 14 (e.g., at or proximate a right side or right edge of the seat back portion 14).

It is noted, however, that one or more vibration sensors 22a, 22b, 22c may alternatively be mounted at any location or locations on the seat back portion 14, and/or at any location or locations on the seat bottom portion 12, and/or at any location or locations on the headrest 16. In that regard, the location or locations of the vibration sensor(s) 22a, 22b, 22c may depend on packaging constraints and/or empirical tuning of effective vibration sensing for a particular vehicle seat design. While a single vibration sensor may be employed, multiple vibration sensors in any number may be utilized where differences in stiffness are exhibited in different portions or at different locations of a vehicle seat given a particular seat design and/or to provide redundancy in the event of a failure or malfunction of a vibration sensor.

The vibration dampening system 8 of the present disclosure further comprises a control module or controller 24. In that regard, each vibration sensor 22a, 22b, 22c generates a signal indicative of the sensed vibration of the vehicle seat 10, which signal is provided, sent, or transmitted to the controller 24. Based on the signal received from the vibration sensors 22a, 22b, 22c, the controller 24 determines a counter vibration to dampen, reduce, and/or cancel the vibration of the vehicle seat 10 sensed by the vibration sensors 22a, 22b, 22c. To determine such a counter vibration, the controller 24 includes computer executable instructions stored in or on a computer readable medium that enable the controller to process the signal received from the vibration sensors 22a, 22b, 22c. More specifically, when executed by the controller 24, such instructions enable the controller 24 to analyze the input signals received from the vibration sensors 22a, 22b, 22c to determine a counter vibration sufficient to dampen, reduce, and/or cancel the sensed vibration of the vehicle seat 10, if such a counter vibration were to be imparted to the vehicle seat 10. In that regard, the algorithm performed by the controller 24 when executing such instructions is similar to algorithms employed for sound or audio cancellation, such as in electronic headphones, according to which a low-frequency sound (e.g., less than or equal to 250 Hertz (hz)) is determined and actively generated that is sufficient to effectively cancel out background and/or ambient sound sensed by one or more sensors.

In that regard, as those skilled in the art will understand, the control module or controller 24, as well as any other component, system, subsystem, unit, module, circuit, stage, interface, sensor, transducer, device, or the like described herein may individually, collectively, or in any combination comprise appropriate circuitry, such as one or more appropriately programmed processors (e.g., one or more microprocessors including central processing units (CPU)) and associated memory, which may include stored operating system software, firmware, and/or application software executable by the processor(s) for controlling operation thereof, any component, system, subsystem, unit, module, circuit, stage, interface, sensor, transducer, device, or the like described herein, and/or for performing the particular algorithm or algorithms represented by the various methods, functions and/or operations described herein, including interaction between and/or cooperation with each other.

Still referring to FIGS. 1 and 2, the vibration dampening system 8 of the present disclosure still further comprises at least one transducer 26a, 26b, 26c, 26d. In that regard, based on the determination by the controller 24 of a counter vibration as described herein, the controller 24 produces or outputs a control signal or control signals to effect generation of the counter vibration. Such a control signal(s) is provided, sent, or transmitted from the controller 24 to the transducers 26a, 26b, 26c, 26d, which receive as input such a control signal(s) from the controller 24 and create vibration in the vehicle seat 10 to cancel out the road load vibration. That is, in response to such a control signal(s), each transducer 26a, 26b, 26c, 26d generates a counter vibration of the vehicle seat 10 to dampen the vibration of the vehicle seat 10 sensed by the at least one vibration sensor 22a, 22b, 22c.

As seen in FIG. 1, a transducer 26a is located or mounted on a first or left side of a longitudinal axis (A-A) bisecting the seat back portion 14 from a first or top side of the seat back portion 14 to a second or bottom side of the seat back portion 14, proximate a top of the seat back portion 14. Another transducer 26b is located or mounted on a second or right side of the longitudinal axis (A-A) bisecting the seat back portion 14, proximate the top of the seat back portion 14.

As seen in FIG. 2, additional transducers 26c, 26d are located or mounted in the seat bottom portion 12. In that regard, one transducer 26c located or mounted in the seat bottom portion 12 is located or mounted on a first side of a latitudinal axis (i.e., normal to the sheet on which FIG. 2 is illustrated) bisecting the seat bottom portion 12 from a first side of the seat bottom portion 12 to a second side of the seat bottom portion 12 (i.e., the transducer 26c is located or mounted closer to the back of the seat bottom portion 12 than to the front of the seat bottom portion 12). The other transducer 26d in the seat bottom portion 12 is located or mounted on a second side of the latitudinal axis bisecting the seat bottom portion 12 (i.e., the transducer 26d is located or mounted closer to the front of the seat bottom portion 12 than to the back of the seat bottom portion 12).

The transducers 26a, 26b, 26c, 26d may comprise a haptic device of any known type. In that regard, such a haptic device may comprise an electric motor (not shown) and a sprung mass or weight (not shown) moved by the electric motor in a low-frequency oscillating fashion, as illustrated by the arrows (m) shown in FIG. 2. Such a low frequency oscillation causes the transducers 26a, 26b, 26c, 26d to induce the counter vibration in the vehicle seat 10 determined by the controller 24 as previously described and sufficient to cancel, reduce, and/or dampen the vibration of the vehicle seat 10 caused or generated by road loading of the vehicle as also previously described. In that regard, the transducers 26a, 26b, 26c, 26d are configured to generate suitable low-frequency counter vibrations (i.e., less than or equal to 250 Hz) because road loading produces low-frequency vibrations in the vehicle seat 10. Moreover, higher frequency vibrations in the vehicle seat 10 are canceled by the vehicle frame or structure.

It is noted, however, that one or more transducers 26a, 26b, 26c, 26d may alternatively be mounted at any location or locations on the seat back portion 14, and/or at any location or locations on the seat bottom portion 12, and/or at any location or locations on the headrest 16. In that regard, the location or locations of the transducers 26a, 26b, 26c, 26d may depend on packaging constraints and/or empirical tuning of effective inducement of vibration in a vehicle seat given a particular vehicle seat design. While a single transducer may be employed, multiple transducers in any number may be utilized where differences in stiffness are exhibited in different portions or at different locations of a vehicle seat given a particular seat design and/or to provide redundancy in the event of a failure or malfunction of a transducer. Moreover, transducers may be located or mounted on a vehicle seat in proximity to vibration sensors to generate vibration in the vehicle seat that more effectively counters the vibration in the vehicle seat sensed by the proximate vibration sensor, and the controller 24 may be programmed to associate particular vibration sensors and transducers with each other and/or with a location on or in the vehicle seat in order to do so when analyzing vehicle seat vibration detected by vibration sensors and determining counter vibrations to be produced in the vehicle seat by transducers to cancel, dampen, and/or reduce sensed vibrations as described herein.

Figure 3A:
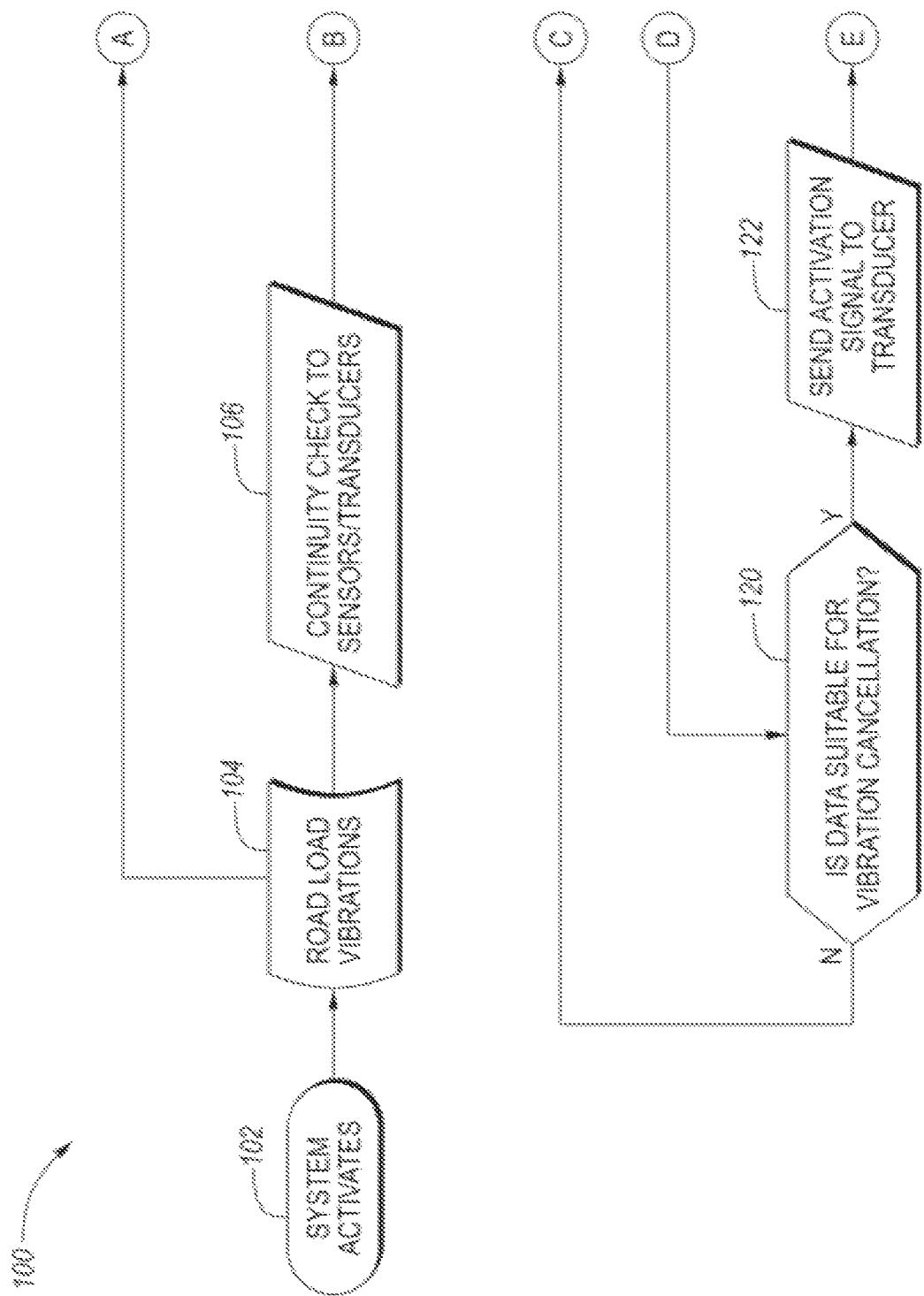
FIGS. 3A-3C are an exemplary flow chart of a non-limiting, exemplary embodiment of a method according to the present disclosure for controlling a non-limiting, exemplary embodiment of a seat vibration dampening system according to the present application.
Figure 3B:
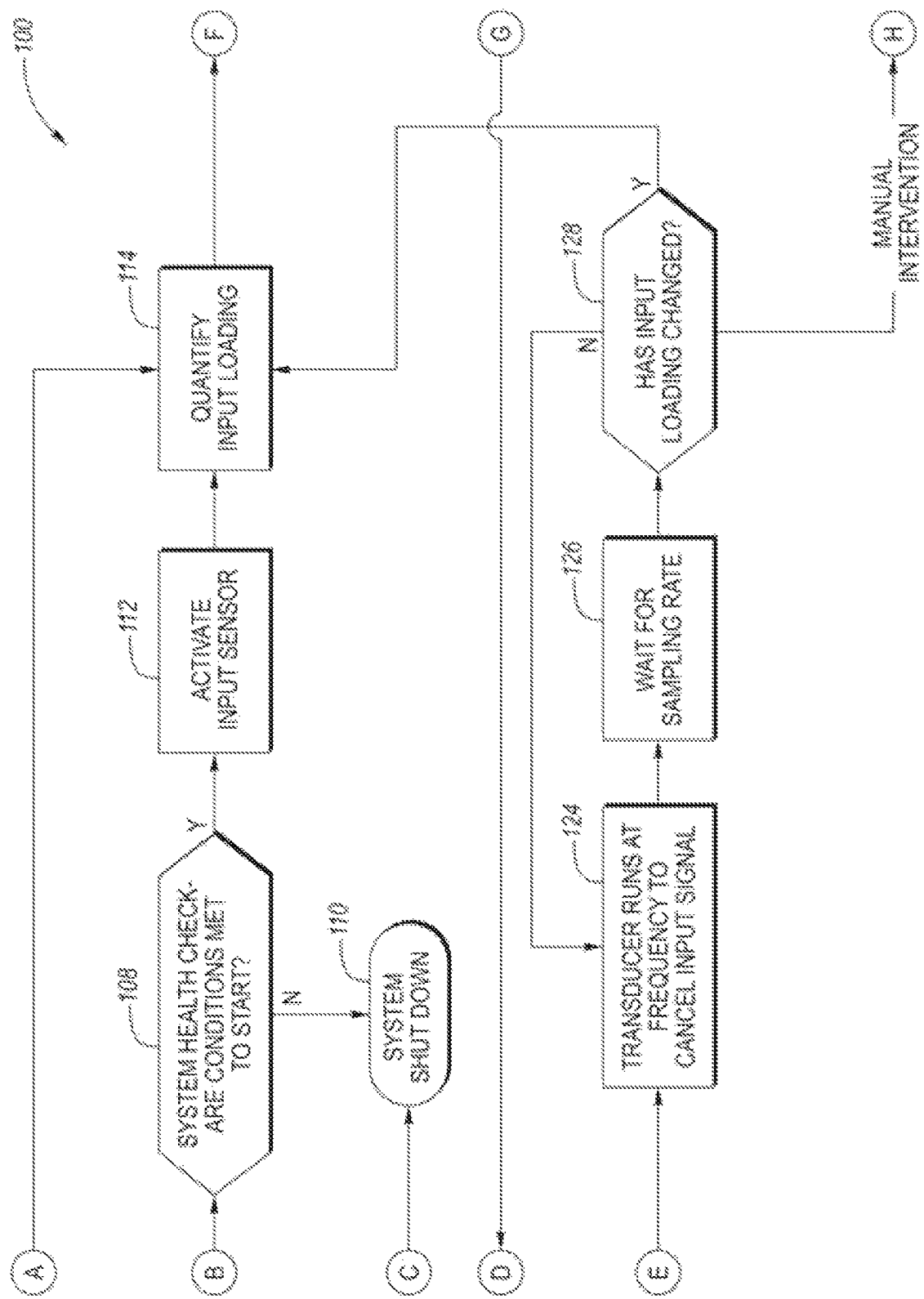
Figure 3C:
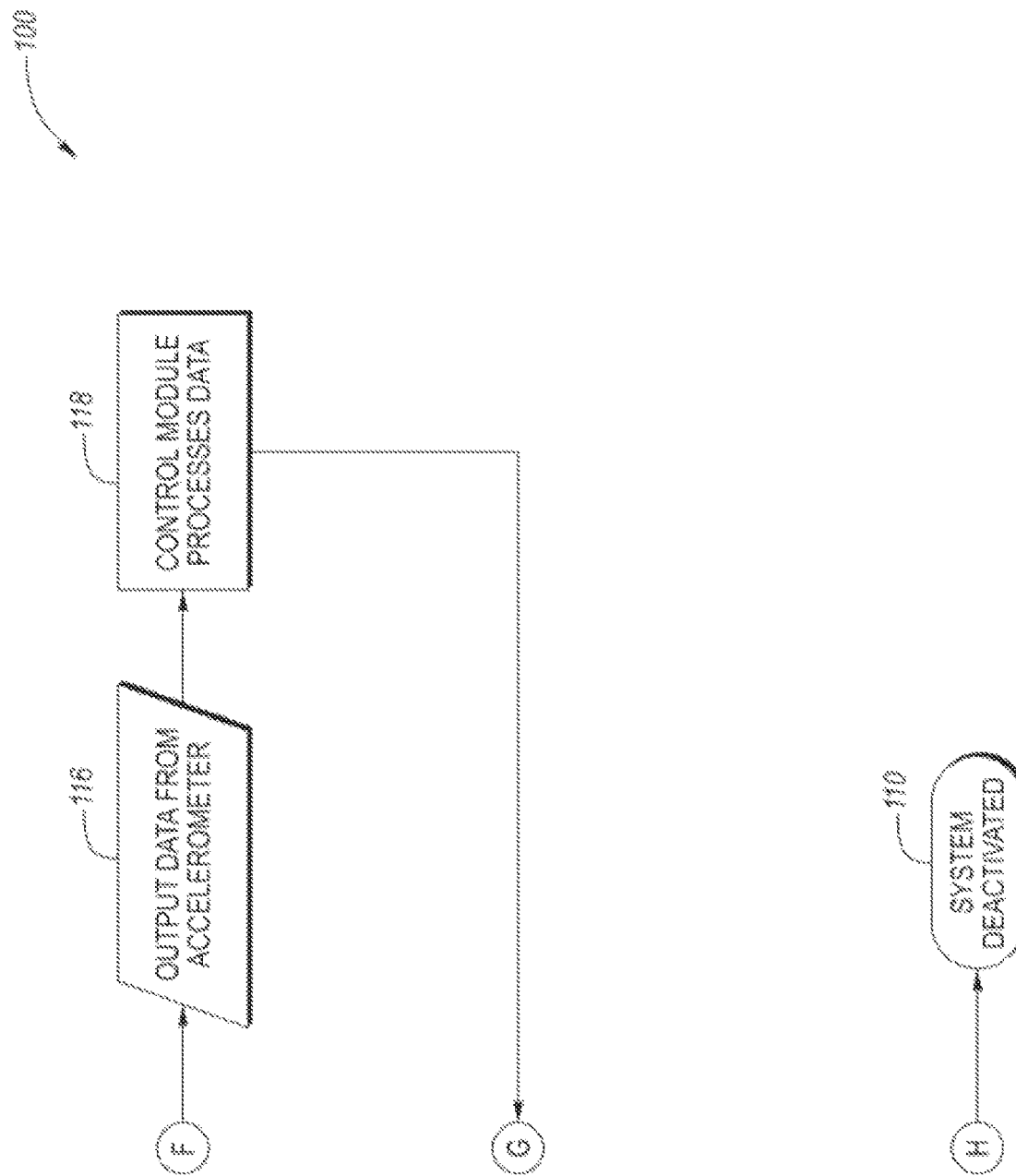

FIGS. 3A-3C are an exemplary flow chart of a non-limiting, exemplary embodiment of a method 100 according to the present disclosure for controlling a non-limiting, exemplary embodiment of a seat vibration dampening system 8 according to the present application. As seen therein, and with continuing reference to FIGS. 1 and 2, the method 100 begins with activation 102 of the seat vibration dampening system 8, followed by generation of road load vibrations 104 when the vehicle is driven on a roadway. Thereafter, a continuity check is performed 106, such as by the controller 24, to check the vibration sensors 22a, 22b, 22c and the transducers 26a, 26b, 26c, 26d. A determination is then made 108, such as by the controller 24, regarding system health and whether conditions have been met to start the analysis described herein. If not, then the vehicle seat dampening system 8 is shut down or deactivated 110.

Alternatively, if the conditions have been met 108 to start the analyses described herein, then the vibration sensors 22a, 22b, 22c are activated 112 to quantify the input loading 114 based on the road load vibrations 104. Subsequently, the vibration sensors (e.g. accelerometers) 22a, 22b, 22c output data 116 in the form of a signal or signals indicative of the sensed vibration of the vehicle seat 10. Such signals are received and the data thereof are processed 118 by the control module or controller 24 as described herein. A determination is then made 120 by the controller 24 as to whether such input data is suitable for vibration cancelation (e.g., whether the vibration of the vehicle seat 10 is above a vibration threshold value and requires cancellation, or whether the vibration of the vehicle seat 10 previously detected and reported by the vibration sensors 22a, 22b, 22c has been successfully or adequately dampened, canceled, and/or reduced as described herein). If not, then the vehicle seat dampening system 8 is shut down or deactivated 110.

Otherwise, if the input data from the vibration sensors is suitable for vibration cancelation 120, after determining the counter vibration suitable to perform such cancelation as described herein, the controller 24 sends one or more activation signals 122 to the transducers 26a, 26b, 26c, 26d. Upon receipt of such activation signals, the transducers 26a, 26b, 26c, 26d run 124 at the required frequency determined by the controller 24 to cancel the input vibration signals received by the controller 24 from the vibration sensors 22a, 22b, 22c. In such a fashion, the transducers 26a, 26b, 26c, 26d thereby generate the counter vibrations in the vehicle seat 10 required to perform such cancelation, dampening, or reduction.

After waiting for a sampling rate 126, the controller 24 then determines whether the input loading has changed 128. If so, then the input loading is again quantified 114 and the method thereafter proceeds as previously described. If not, the controller 24 continues to controller the transducers 26a, 26b, 26c, 26d to run 124 at the required frequency determined by the controller 24 to cancel the input vibration signals received by the controller 24 from the vibration sensors 22a, 22b, 22c and the method 100 thereafter proceeds as previously described. Once again, in such a fashion, the transducers 26a, 26b, 26c, 26d thereby generate the counter vibrations in the vehicle seat 10 required to perform such cancelation. In addition, manual intervention by an occupant of the vehicle or vehicle seat 10 is also an available option to shut down or deactivate 110 the vehicle seat dampening system 8 manually.

The present disclosure thus provides a vehicle seat vibration dampening system and method for controlling such a system. The present disclosure provides such a system and method that are active, rather than passive, and cancel out road load vibration by sensing seat vibration and generating in response a counter vibration, and thus represent an improvement over passive mass dampers for vehicle seats. The system and method of the present disclosure utilize low frequency transducers/shakers for the purpose of reduction of vehicle seat vibration, which transducers are fitted to a vehicle seat for the reduction of vibration resulting from road loading. In particular, such transducers are mounted in an effective way for the strategic cancelation of road generated vibrations, and are coupled with vibration detection measuring equipment and software control to excite the system to cancel out input vibrations. In such a fashion, the system and method of the present disclosure solve the problem of seat vibrations and/or seat resonance caused by vibrations generated as a result of driving a vehicle on a roadway.

Item 1: According to an embodiment, the present disclosure provides a vehicle seat vibration dampening system comprising a vibration sensor that senses vibration of a vehicle seat generated by movement of a vehicle on a roadway, wherein the vibration sensor generates a signal indicative of the sensed vibration, a controller that determines, based on the signal generated by the vibration sensor, a counter vibration to dampen the sensed vibration of the vehicle seat and, based on the determination, produces a control signal to effect generation of the counter vibration, and a transducer that generates the counter vibration of the vehicle seat in response to the control signal to dampen the sensed vibration of the vehicle seat.

Item 2: In another embodiment, the present disclosure provides the vehicle seat vibration dampening system of Item 1 wherein the vehicle seat comprises a seat bottom portion and a seat back portion, and wherein the vibration sensor comprises at least one seat bottom vibration sensor and at least one seat back vibration sensor.

Item 3: In another embodiment, the present disclosure provides the vehicle seat vibration dampening system of Item 1 or Item 2 wherein the at least one seat back vibration sensor comprises a seat back vibration sensor mounted along a longitudinal axis bisecting the seat back portion from a first side of the seat back portion to a second side of the seat back portion.

Item 4: In another embodiment, the present disclosure provides the vehicle seat vibration dampening system of any of Items 1-3 wherein the at least one seat back vibration sensor comprises a first seat back vibration sensor mounted on a first side of a longitudinal axis bisecting the seat back portion from a first side of the seat back portion to a second side of the seat back portion, and a second seat back vibration sensor mounted on a second side of the longitudinal axis bisecting the seat back portion.

Item 5: In another embodiment, the present disclosure provides the vehicle seat vibration dampening system of any of Items 1-4 wherein the vibration sensor comprises a displacement sensor, a velocity sensor, or an accelerometer.

Item 6: In another embodiment, the present disclosure provides the vehicle seat vibration dampening system of any of Items claim 1-5 wherein the vehicle seat comprises a seat bottom portion and a seat back portion, and wherein the transducer comprises at least one seat bottom transducer or at least one seat back transducer.

Item 7: In another embodiment, the present disclosure provides the vehicle seat vibration dampening system of any of Items 1-6 wherein the at least one seat back transducer comprises a first seat back transducer and a second seat back transducer, the first seat back transducer mounted on a first side of a longitudinal axis bisecting the seat back portion from a first side of the seat back portion to a second side of the seat back portion, and the second seat back transducer mounted on a second side of the longitudinal axis bisecting the seat back portion.

Item 8: In another embodiment, the present disclosure provides the vehicle seat vibration dampening system of any of Items 1-7 wherein the at least one seat bottom transducer comprises a first seat bottom transducer and a second seat bottom transducer, the first seat bottom transducer mounted on a first side of a latitudinal axis bisecting the seat bottom portion from a first side of the seat bottom portion to a second side of the seat bottom portion, and the second seat bottom transducer mounted on a second side of the latitudinal axis bisecting the seat bottom portion.

Item 9: In another embodiment, the present disclosure provides the vehicle seat vibration dampening system of any of Items 1-8 wherein the transducer comprises a haptic device.

Item 10: In another embodiment, the present disclosure provides a vehicle seat comprising the vehicle seat vibration dampener of any of Items 1-9.

Item 11: According to an embodiment, the present disclosure provides a non-transitory computer readable medium having stored computer executable instructions for controlling a vehicle seat vibration dampening system comprising a vibration sensor that senses vibration of a vehicle seat generated by movement of a vehicle on a roadway, wherein the vibration sensor generates a signal indicative of the sensed vibration, a transducer that generates a counter vibration to dampen the sensed vibration of the vehicle seat, and a controller, wherein execution of the instructions causes the controller to determine, based on the signal generated by the vibration sensor, a counter vibration to dampen the sensed vibration of the vehicle seat, produce a control signal to effect generation of the counter vibration by the transducer based on the determination, and transmit the control signal to the transducer to generate the counter vibration of the vehicle seat to dampen the sensed vibration of the vehicle seat.

Item 12: In another embodiment, the present disclosure provides the non-transitory computer readable medium of Item 11 wherein the vehicle seat comprises a seat bottom portion and a seat back portion, and wherein the vibration sensor comprises at least one seat bottom vibration sensor and at least one seat back vibration sensor.

Item 13: In another embodiment, the present disclosure provides the non-transitory computer readable medium of Item 11 or Item 12 wherein the at least one seat back vibration sensor comprises a seat back vibration sensor mounted along a longitudinal axis bisecting the seat back portion from a first side of the seat back portion to a second side of the seat back portion.

Item 14: In another embodiment, the present disclosure provides the non-transitory computer readable medium of any of Items 11-13 wherein the at least one seat back vibration sensor comprises a first seat back vibration sensor mounted on a first side of a longitudinal axis bisecting the seat back portion from a first side of the seat back portion to a second side of the seat back portion, and a second seat back vibration sensor mounted on a second side of the longitudinal axis bisecting the seat back portion.

Item 15: In another embodiment, the present disclosure provides the non-transitory computer readable medium of any of Items 11-14 wherein the vibration sensor comprises a displacement sensor, a velocity sensor, or an accelerometer.

Item 16: In another embodiment, the present disclosure provides the non-transitory computer readable medium of any of Items 11-15 wherein the vehicle seat comprises a seat bottom portion and a seat back portion, and wherein the transducer comprises at least one seat bottom transducer or at least one seat back transducer.

Item 17: In another embodiment, the present disclosure provides the non-transitory computer readable medium of any of Items 11-16 wherein the at least one seat back transducer comprises a first seat back transducer and a second seat back transducer, the first seat back transducer mounted on a first side of a longitudinal axis bisecting the seat back portion from a first side of the seat back portion to a second side of the seat back portion, and the second seat back transducer mounted on a second side of the longitudinal axis bisecting the seat back portion.

Item 18: In another embodiment, the present disclosure provides the non-transitory computer readable medium of any of Items 11-17 wherein the at least one seat bottom transducer comprises a first seat bottom transducer and a second seat bottom transducer, the first seat bottom transducer mounted on a first side of a latitudinal axis bisecting the seat bottom portion from a first side of the seat bottom portion to a second side of the seat bottom portion, and the second seat bottom transducer mounted on a second side of the latitudinal axis bisecting the seat bottom portion.

Item 19: In another embodiment, the present disclosure provides the non-transitory computer readable medium of any of Items 11-18 wherein the transducer comprises a haptic device.

Item 20: In another embodiment, the present disclosure provides the non-transitory computer readable medium of any of Items 11-19 wherein the control signal produced by the controller for controlling the transducer depends on a location of the transducer in the vehicle seat.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, unless the context clearly indicates otherwise, the various features, elements, components, methods, procedures, steps, and/or functions of various implementing embodiments may be combined or utilized in any combination or combinations and/or may be performed in any order other than those specifically described herein to form further embodiments according to the present disclosure.

What is claimed is:

1. A vehicle seat vibration dampening system comprising:
    a vibration sensor that senses vibration of a vehicle seat generated by movement of a vehicle on a roadway, wherein the vibration sensor generates a signal indicative of the sensed vibration;
    a controller that determines, based on the signal generated by the vibration sensor, a counter vibration to dampen the sensed vibration of the vehicle seat and, based on the determination, produces a control signal to effect generation of the counter vibration; and
    a transducer that generates the counter vibration of the vehicle seat in response to the control signal to dampen the sensed vibration of the vehicle seat.

2. The vehicle seat vibration dampening system of claim 1 wherein the vehicle seat comprises a seat bottom portion and a seat back portion, and wherein the vibration sensor comprises at least one seat bottom vibration sensor and at least one seat back vibration sensor.

3. The vehicle seat vibration dampening system of claim 2 wherein the at least one seat back vibration sensor comprises a seat back vibration sensor mounted along a longitudinal axis bisecting the seat back portion from a first side of the seat back portion to a second side of the seat back portion.

4. The vehicle seat vibration dampening system of claim 3 wherein the at least one seat back vibration sensor comprises a first seat back vibration sensor mounted on a first side of a longitudinal axis bisecting the seat back portion from a first side of the seat back portion to a second side of the seat back portion, and a second seat back vibration sensor mounted on a second side of the longitudinal axis bisecting the seat back portion.

5. The vehicle seat vibration dampening system of claim 1 wherein the vibration sensor comprises a displacement sensor, a velocity sensor, or an accelerometer.

6. The vehicle seat vibration dampening system of claim 1 wherein the vehicle seat comprises a seat bottom portion and a seat back portion, and wherein the transducer comprises at least one seat bottom transducer or at least one seat back transducer.

7. The vehicle seat vibration dampening system of claim 6 wherein the at least one seat back transducer comprises a first seat back transducer and a second seat back transducer, the first seat back transducer mounted on a first side of a longitudinal axis bisecting the seat back portion from a first side of the seat back portion to a second side of the seat back portion, and the second seat back transducer mounted on a second side of the longitudinal axis bisecting the seat back portion.

8. The vehicle seat vibration dampening system of claim 6 wherein the at least one seat bottom transducer comprises a first seat bottom transducer and a second seat bottom transducer, the first seat bottom transducer mounted on a first side of a latitudinal axis bisecting the seat bottom portion from a first side of the seat bottom portion to a second side of the seat bottom portion, and the second seat bottom transducer mounted on a second side of the latitudinal axis bisecting the seat bottom portion.

9. The vehicle seat vibration dampening system of claim 1 wherein the transducer comprises a haptic device.

10. A vehicle seat comprising the vehicle seat vibration dampening system of claim 1.

11. A non-transitory computer readable medium having stored computer executable instructions for controlling a vehicle seat vibration dampening system comprising a vibration sensor that senses vibration of a vehicle seat generated by movement of a vehicle on a roadway, wherein the vibration sensor generates a signal indicative of the sensed vibration, a transducer that generates a counter vibration to dampen the sensed vibration of the vehicle seat, and a controller, wherein execution of the instructions causes the controller to:
    determine, based on the signal generated by the vibration sensor, a counter vibration to dampen the sensed vibration of the vehicle seat;
    produce a control signal to effect generation of the counter vibration by the transducer based on the determination; and
    transmit the control signal to the transducer to generate the counter vibration of the vehicle seat to dampen the sensed vibration of the vehicle seat.

12. The non-transitory computer readable medium of claim 11 wherein the vehicle seat comprises a seat bottom portion and a seat back portion, and wherein the vibration sensor comprises at least one seat bottom vibration sensor and at least one seat back vibration sensor.

13. The non-transitory computer readable medium of claim 12 wherein the at least one seat back vibration sensor comprises a seat back vibration sensor mounted along a longitudinal axis bisecting the seat back portion from a first side of the seat back portion to a second side of the seat back portion.

14. The non-transitory computer readable medium of claim 13 wherein the at least one seat back vibration sensor comprises a first seat back vibration sensor mounted on a first side of a longitudinal axis bisecting the seat back portion from a first side of the seat back portion to a second side of the seat back portion, and a second seat back vibration sensor mounted on a second side of the longitudinal axis bisecting the seat back portion.

15. The non-transitory computer readable medium of claim 11 wherein the vibration sensor comprises a displacement sensor, a velocity sensor, or an accelerometer.

16. The non-transitory computer readable medium of claim 11 wherein the vehicle seat comprises a seat bottom portion and a seat back portion, and wherein the transducer comprises at least one seat bottom transducer or at least one seat back transducer.

17. The non-transitory computer readable medium of claim 16 wherein the at least one seat back transducer comprises a first seat back transducer and a second seat back transducer, the first seat back transducer mounted on a first side of a longitudinal axis bisecting the seat back portion from a first side of the seat back portion to a second side of the seat back portion, and the second seat back transducer mounted on a second side of the longitudinal axis bisecting the seat back portion.

18. The non-transitory computer readable medium of claim 16 wherein the at least one seat bottom transducer comprises a first seat bottom transducer and a second seat bottom transducer, the first seat bottom transducer mounted on a first side of a latitudinal axis bisecting the seat bottom portion from a first side of the seat bottom portion to a second side of the seat bottom portion, and the second seat bottom transducer mounted on a second side of the latitudinal axis bisecting the seat bottom portion.

19. The non-transitory computer readable medium of claim 11 wherein the transducer comprises a haptic device.

20. The non-transitory computer readable medium of claim 11 wherein the control signal produced by the controller for controlling the transducer depends on a location of the transducer in the vehicle seat.

* * * * *